United States Patent [19]

Reese et al.

[11] Patent Number: 5,051,122
[45] Date of Patent: Sep. 24, 1991

[54] METHOD AND APPARATUS FOR MANUFACTURING CONTINUOUS FIBER GLASS STRAND REINFORCING MAT

[75] Inventors: Walter J. Reese, North Huntington; Anastasia Morfesis, Pittsburgh; George T. Salego, Brackenridge; David A. Vorp, Apollo, all of Pa.

[73] Assignee: PPG Industries, Inc., Pittsburgh, Pa.

[21] Appl. No.: 547,369

[22] Filed: Jul. 2, 1990

Related U.S. Application Data

[63] Continuation-in-part of Ser. No. 460,484, Jan. 3, 1990, abandoned.

[51] Int. Cl.⁵ .............................. C03C 25/02
[52] U.S. Cl. .......................... 65/3.43; 65/2; 65/4.4; 65/9; 156/62.2; 156/167; 428/288
[58] Field of Search .......... 65/3.43, 3.44, 4.4, 65/2, 9; 428/288, 228; 156/62.2, 166, 167

[56] References Cited

U.S. PATENT DOCUMENTS

| | | |
|---|---|---|
| 805,963 | 11/1905 | Jackson . |
| 2,344,601 | 3/1944 | Collins .................. 65/4.4 X |
| 3,215,585 | 11/1965 | Kneipple .................. 161/170 |
| 3,318,746 | 5/1967 | Langlois .................. 156/167 |
| 3,446,610 | 5/1969 | Riedel et al. .................. 65/9 |
| 3,486,867 | 12/1969 | Wilson .................. 65/2 |
| 3,713,962 | 1/1973 | Ackley .................. 161/154 |
| 3,814,592 | 6/1974 | McWilliams et al. .................. 65/3 |
| 3,849,148 | 11/1974 | Temple .................. 106/287 SB |
| 3,854,917 | 12/1974 | McKinney et al. .................. 65/3.43 |
| 3,883,333 | 5/1975 | Ackley .................. 65/2 |
| 3,915,681 | 10/1975 | Ackley .................. 65/9 |
| 3,996,032 | 12/1976 | McWilliams et al. .................. 65/3 C |
| 4,158,557 | 6/1979 | Drummond .................. 65/2 |
| 4,194,947 | 3/1980 | Huostila et al. .................. 162/207 |
| 4,224,373 | 9/1980 | Marzocchi .................. 428/288 |
| 4,238,284 | 12/1980 | Huostila et al. .................. 162/207 |
| 4,277,531 | 7/1981 | Picone .................. 428/228 |
| 4,340,406 | 7/1982 | Neubauer .................. 65/9 |
| 4,345,927 | 8/1982 | Picone .................. 65/4.4 |
| 4,404,717 | 9/1983 | Neubauer et al. .................. 28/107 |
| 4,604,319 | 8/1986 | Evans et al. .................. 428/290 |
| 4,615,717 | 10/1986 | Neubauer .................. 65/4.4 |
| 4,756,957 | 7/1988 | Kielmeyer .................. 428/288 |
| 4,955,999 | 9/1990 | Schaefer et al. .................. 65/4.4 |

OTHER PUBLICATIONS

"The Manufacturing Technology of Continuous Glass Fibers", K. L. Lowenstein, Elsevier Publishing Compnay, 1973, pp. 234–251; 97–106 and 24–26.
"Gessner Transcolorizer ®", Trantechnology Corporation, Gessner Company, Worcester, Massachusetts.
"Textile Calender Systems Engineered for Market Versatility", B. F. Perkins, Division of Roehlen Industries, Chicopee, Massachusetts (1982).
"Farmer Norton Four-Point Camber Control Systems", Sir James Farmer Norton International; Slford, Manchester, England.
"Thermobonding Calendar", Sir James Farmer Norton International; Salford, Manchester, England.
"Informational Brochure", B. F. Perkins, Divisions of Roehlen Industries; Chicopee, Massachusetts.
"Thermobonding of Polypropylene Fibers", S. B. Warner, *Textile Research Journal*, vol. 59, No. 3, Mar. 1989, pp. 151–159.
"Technical Specifications, STRATL TM P-80", Rhone-Poulence Polymers, Paris, France (English Translation and Material Safety Data Sheet Included).
"Products for Glass Fiber Treatments", Maffei, Chimica, Italy.

*Primary Examiner*—Robert L. Lindsay
*Attorney, Agent, or Firm*—Andrew C. Siminerio

[57] ABSTRACT

The subject matter of this invention relates to a method and apparpatus for making mats of continuous glass fiber strands in which a heated calendering roll and continuous belt are used to compact the mat, expel excess noisture, melt, and/or cure resin previously distributed throughout the glass strand. The resin may be deposited in the mat in the form of a powdered resin or as continuous thread of material that is combined with the remaining strands that form the mat as the glass strands are projected onto the surface of a moving conveyor to form the mat.

27 Claims, 5 Drawing Sheets

METHOD AND APPARATUS FOR MANUFACTURING CONTINUOUS FIBER GLASS STRAND REINFORCING MAT

This is a continuation-in-part application of U.S. Ser. No. 07/460,484, filed Jan. 3, 1990 now abandoned.

The instant invention relates to a method and apparatus for making mats of fiberous material, and in particular to making mats of continuous glass fiber strand. A heated calendering roll and continuous belt are used to compact the mat, expel excess moisture, melt, and cure a resin distributed throughout the glass strand comprising the mat. The mat is a continuous strand mat wherein the resin is deposited in the form of a powdered resin or a continuous thread of material at the same time the glass strand is projected onto the surface of a moving conveyor to form the loose mat structure.

BACKGROUND OF THE INVENTION

Glass fibers and glass fiber strands have been used before in the art to produce various types of glass fiber mats for use as reinforcement material. The basic principles of mat-making are well known in the art and fully described in the book entitled *The Manufacturing Technology of Continuous Glass Fibers* by K. L. Lowenstein, published by the Elsevier Publishing Company, 1973, at pages 234 to 251.

A particular utility for glass fiber mats is in the reinforcement of resinous or polymeric materials since the presence of an integrally molded glass fiber mat substantially increases the strength of these materials. Usually, the mat and a molten resin are processed together to form a thermoset or thermoplastic laminate. Thermoplastic laminates are particularly attractive for use in the aircraft, marine, and automotive industries since they may be reheated into a semi-molten state and then stamped into panels of various shapes such as doors, fenders, bumpers, and the like. Similarly, thermosetting mats may be used in pultrusion processes for the reinforcement of ladder rails, electrical components, and window lineals.

It is important in all of these applications that the glass mats used to make these laminates have as uniform a fiber density distribution as possible. If a non-uniform density mat is used for reinforcement purposes, the products produced therefrom may have a substantial variation in their strength since some areas will be weaker due to the lack of glass fiber reinforcement while others will be stronger. Even more important is the need to insure that the glass fiber mat flows and moves freely within the laminate during stamping operations in order to impart uniform strength to the final components which are produced.

In the production of continuous strand mats, a plurality of strand feeders are positioned above a moving belt or conveyor, typically a continuously driven, flexible, stainless steel chain or other perforated surface. The strand feeders are reciprocated or traversed back and forth above the conveyor parallel to one another and in a direction generally perpendicular to the direction of motion of the moving conveyor. Strands composed of multiple glass fiber filaments are fed to the feeders from a suitable supply source such as a plurality of previously made forming packages.

It is also well known in the art that the feeder can act as an attenuator to attenuate glass fibers directly from a glass fiber-forming bushing and eventually deposit strand formed therefrom directly onto the conveyor as described by Lowenstein, supra, at pages 248 to 251 and further illustrated in U.S. Pat. Nos. 3,883,333 (Ackley) and 4,158,557 (Drummond) and U.S. Pat. Nos. 4,963,176 (Bailey, et al.) and 4,964,891 (Schaefer).

Each feeder apparatus provides the pulling force necessary to advance the strand from the supply source and eventually deposit it upon the surface of the moving conveyor. In a typical production environment, as many as 12 to 16 such strand feeders have been used simultaneously with one another to produce a glass fiber mat. Notable prior art references describing the operation and control of such reciprocating feeders can be found in U.S. Pat. Nos. 3,915,681 (Ackley) and 4,340,406 (Neubauer, et al.) as well as U.S. Pat. No. 4,963,176 (Bailey, et al.) and U.S. Pat. No. 4,964,891 (Schaefer), all of which have been assigned to the same assignee as the subject matter of the present invention.

Once the strand has been deposited on the conveyor to form a random pattern of loose glass strand, mechanical integrity must somehow be imparted to it so that these loose strands can be subsequently handled as a mat and eventually fabricated into a finished laminate. To accomplish this, one method known in the art is to pass the loose strands through a needling loom wherein a plurality of barbed needles are reciprocated up and down so as to penetrate the strands and thereby entangle them with one another. This technique is further described in U.S. Pat. Nos. 3,713,962 (Ackley); 4,277,531 (Picone); and 4,404,717 (Neubauer, et al.). Another method by which the loose strand can be bound into the form of a mat is to impregnate the strand with a chemical resin and then melting it so that the individual strands comprising the mat structure become bonded to one another. Usually, this melting operation takes place inside an oven through which both the conveyor and the strand continually pass. The oven must be of a sufficient length and heated to such a degree that the residence time of the glass strand and resin inside the oven is long enough to thoroughly melt the resin and dry any excess moisture from the strand. Ovens having a length of 20 feet (6.1 meters) or more are not uncommon. As was pointed out in Lowenstein, supra, at pages 245 to 246, the oven is often the largest section of a chopped-strand mat line and the same can be said for continuous strand mat lines as well. Besides the physical size of the oven, there is also the expense associated with its construction and keeping it in continuous operation.

Thus, there exists a need, especially in industrial production environments, to eliminate the use of an oven for melting and/or curing resin impregnated continuous strand fiber glass mats.

There also exists a need to fabricate continuous fiber glass strand mats having uniform density and mechanical properties.

There also exists the need to insure that the resin incorporated to bond the individual glass fiber strands together with one another is distributed as uniformly as possible so that the above-mentioned uniform physical properties will result in both the finished mat and the subsequent laminate sheets and products produced therefrom.

As now will become apparent from the remainder of this disclosure, the instant invention adequately meets these needs by providing an improvement over the present state of the art.

SUMMARY OF THE INVENTION

The present invention relates to a method and apparatus for making a mat of continuous fiber glass strand. A plurality of strand feeders are reciprocated across the surface of a moving perforated conveyor with each feeder drawing at least one strand from a supply source and projecting it onto the surface of the conveyor to form a loose fiberous mat structure. A resinous material is distributed throughout this loose mat which is then passed between a second moving conveyor or belt and at least one heated calendering roller, wherein the loose mat is compacted, residual moisture is expelled, and the resinous material is melted and/or cured to bond the individual glass strands forming the mat together with one another.

In one particular embodiment of the invention, the resinous material is distributed in the mat by spraying the mat with water to wet it. The water may be sprayed directly on the strand in mid-air as it is deposited on the conveyor or it can be sprayed from beneath through the perforated conveyor. A powdered resin is then sprinkled onto the surface of the mat structure and both the mat and the conveyor are then agitated so as to disperse the powdered resin and evenly distribute it throughout the interior of the mat. The mat is then compacted and heated to remove the excess moisture and bond the mat together. The preferred powdered resin is a thermosetting polyethylene-glycol-fumarate although the use of other thermosetting as well as thermoplastic resins is also contemplated.

In another embodiment of the present invention, at least one continuous thread or strand of a previously made resinous material is deposited simultaneously with the glass strand projected from the reciprocating feeders directly onto the surface of the first moving conveyor whereby it is distributed uniformly throughout the loose mat structure. The mat is then heated and compacted to expel any residual moisture and melt and/or cure the thread-like resinous material to bond the individual glass strands forming the mat together with one another.

DETAILED DESCRIPTION OF THE DRAWINGS

Figures 1, 2:
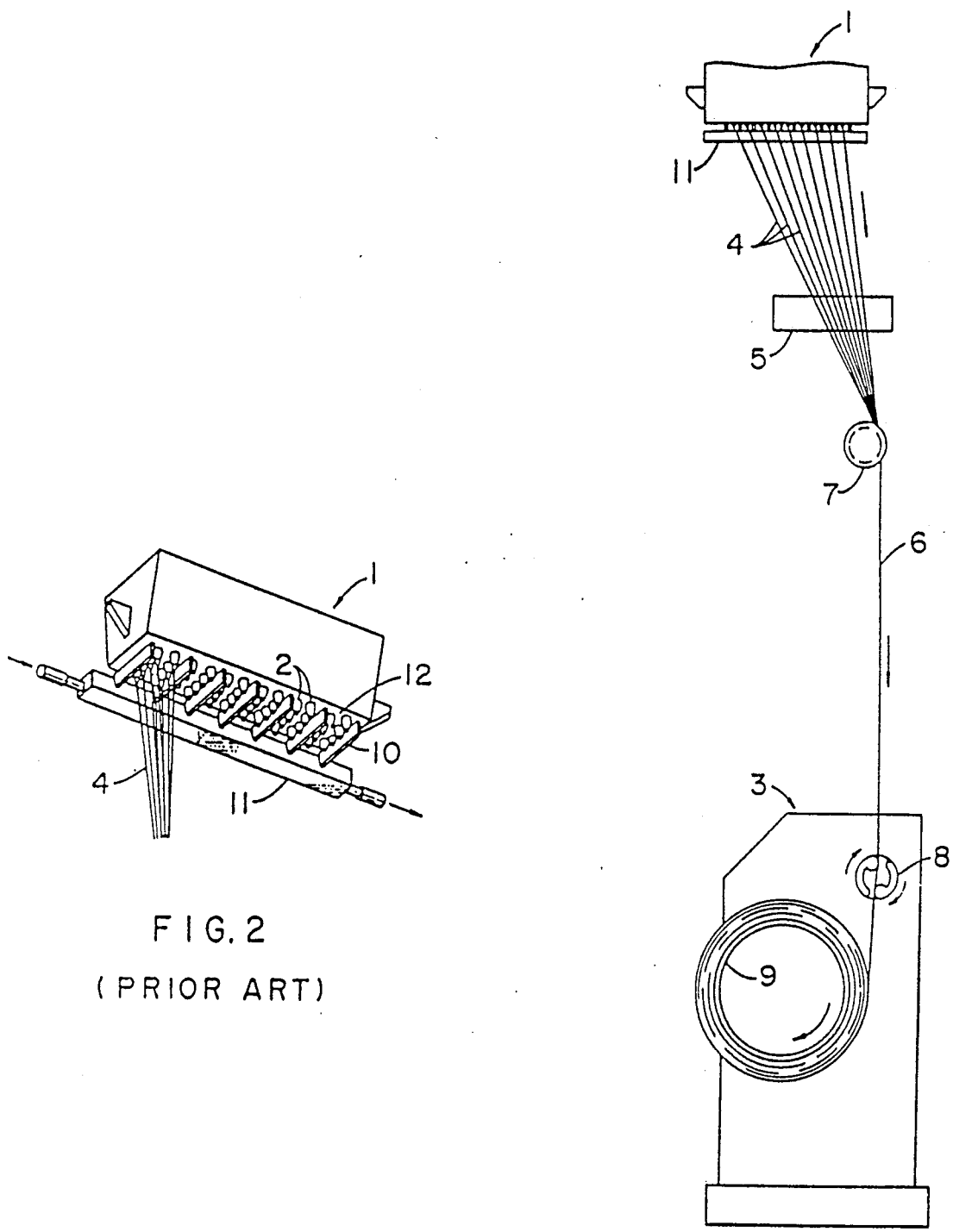
FIG. 1 is a side elevational view of a conventional fiber glass forming process showing a bushing, an applicator, and a winder.
FIG. 2 is a perspective view of a bushing, its associated fin coolers, individual tips, and fibers emerging therefrom.

With reference now to the drawings, FIGS. 1 and 2 illustrate a conventional process for the production of glass fibers wherein molten glass is fed into the top of a bushing assembly (1) and exits from a plurality of tips or orifices (2) to form individual glass cones or jets which are then cooled and attenuated. The glass may be supplied from either a direct-melt forehearth or solid glass marbles may be melted directly inside the bushing instead. Both of these methods are well known in the art and are fully described in Lowenstein, supra, at pages 97 to 106. The drawing force for the attenuation of the cone or jet into an individual glass filament may be supplied by either an appropriately powered rotating winder (3) or a reciprocating belt attenuator that grips the glass fibers and projects them onto the surface of a continuous conveyor as disclosed in U.S. Pat. Nos. 3,883,333 (Ackley) and 4,158,557 (Drummond).

The individual glass fibers or filaments (4) (hereinafter referred to simply as "fibers"), once they have been sufficiently cooled so as to substantially solidify, are contacted with a roller applicator (5) which coats them with a liquid chemical sizing composition. The sizing composition helps to impart lubricity to the individual fibers and also usually contains a binder which provides a bonding agent. The chemical characteristics of the sizing composition and binder are such that they are compatible with the intended end-use of the fibers. For example, when a thermoplastic resin is to be reinforced with glass fibers, then the binder and/or size normally will also include a compatible thermoplastic resin. On the other hand, when the material to be reinforced is a thermoset resin, the binder and/or size will normally include a compatible thermosetting resin.

Resins such as polyesters, polyurethanes, epoxies, polyamides, polyethylenes, polypropylenes, polyvinyl acetates, and the like have all been successfully reinforced with glass fibers. Notable resins which are typically reinforced with continuous glass strand mats are polypropylene, polyesters, and nylon. A preferred binder/size composition for glass fibers intended to be used for the reinforcement of polypropylene is disclosed in U.S. Pat. No. 3,849,148 (Temple). When continuous glass strand mat is used to reinforce a nylon resin, a preferred binder/size composition is that which is disclosed in U.S. Pat. No. 3,814,592 (McWilliams, et al.).

The fibers (4) drawn from the bushing (1) are gathered into single or multiple strands (6) by passing a plurality of individual fibers (4) over a gathering shoe (7). The gathering shoe (7) is typically a graphite cylinder or disc having cut therein a plurality of grooves about its circumference. The number of grooves is equal to the number of individual strands to be formed from a single bushing. The strand (6) is then wound over a rotating spiral (8) and onto a cardboard forming tube (9) which is rotated by an appropriately powered winder (3). The winder (3) may cause either the forming tube (9), spiral (8), or both to reciprocate back and forth along their axis of rotation so that the strand (6) passing over the spiral (8) is wound evenly along the length of the forming tube (9) eventually resulting in a finished forming package (54) of fiber glass strand. Cooling fins (10) are inserted between parallel rows of tips (2) with one end of each fin being attached to a manifold (11) through which a cooling fluid, such as water, is pumped. The fins (10) are positioned so as to absorb radiative heat from the individual glass cones and conduct it to the manifold (11) where it is removed by the cooling fluid. The fins also remove some heat radiated by the tip plate (12).

Figure 3:
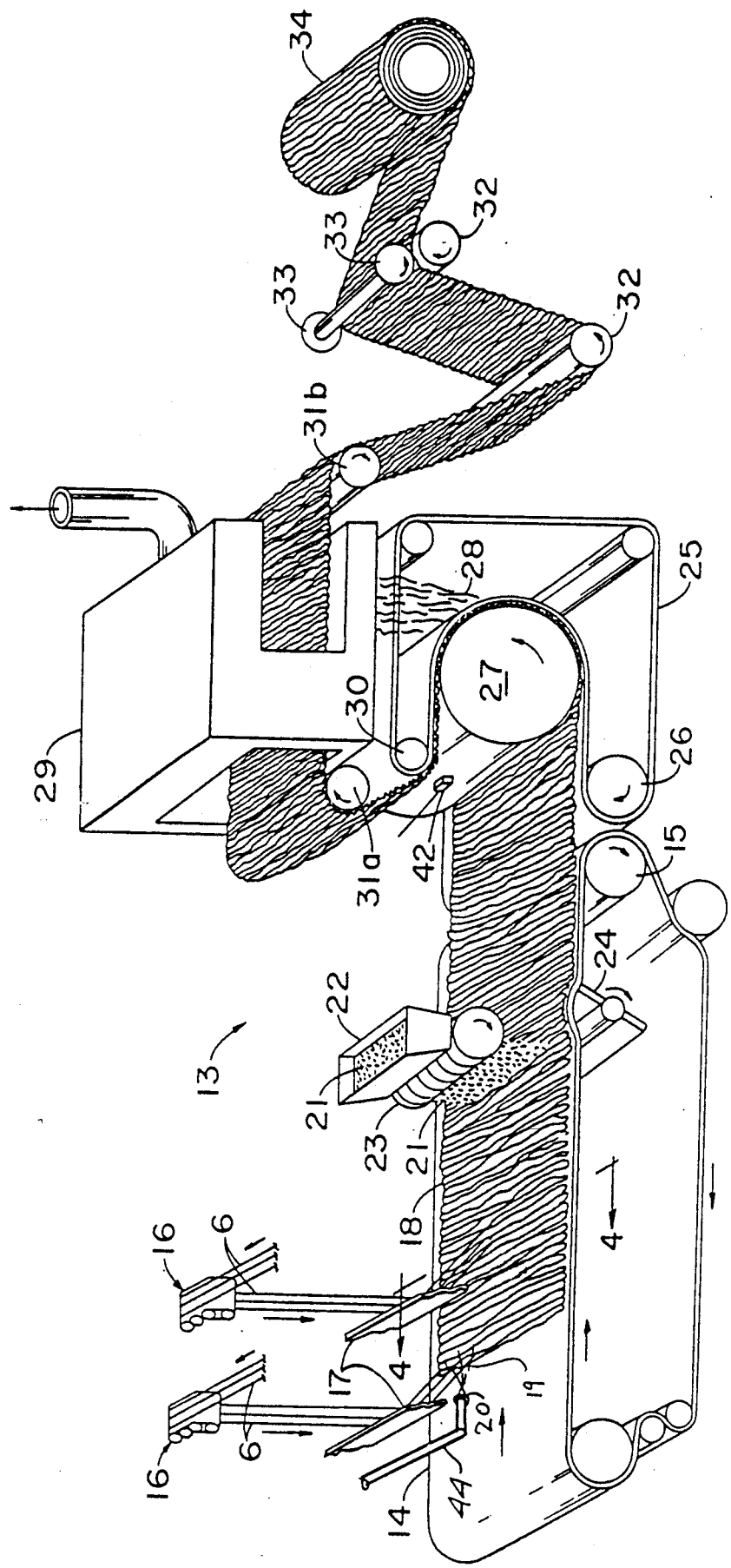
FIG. 3 is a perspective view of a continuous strand mat line employing the heated calendering roll described herein.
Figure 4:
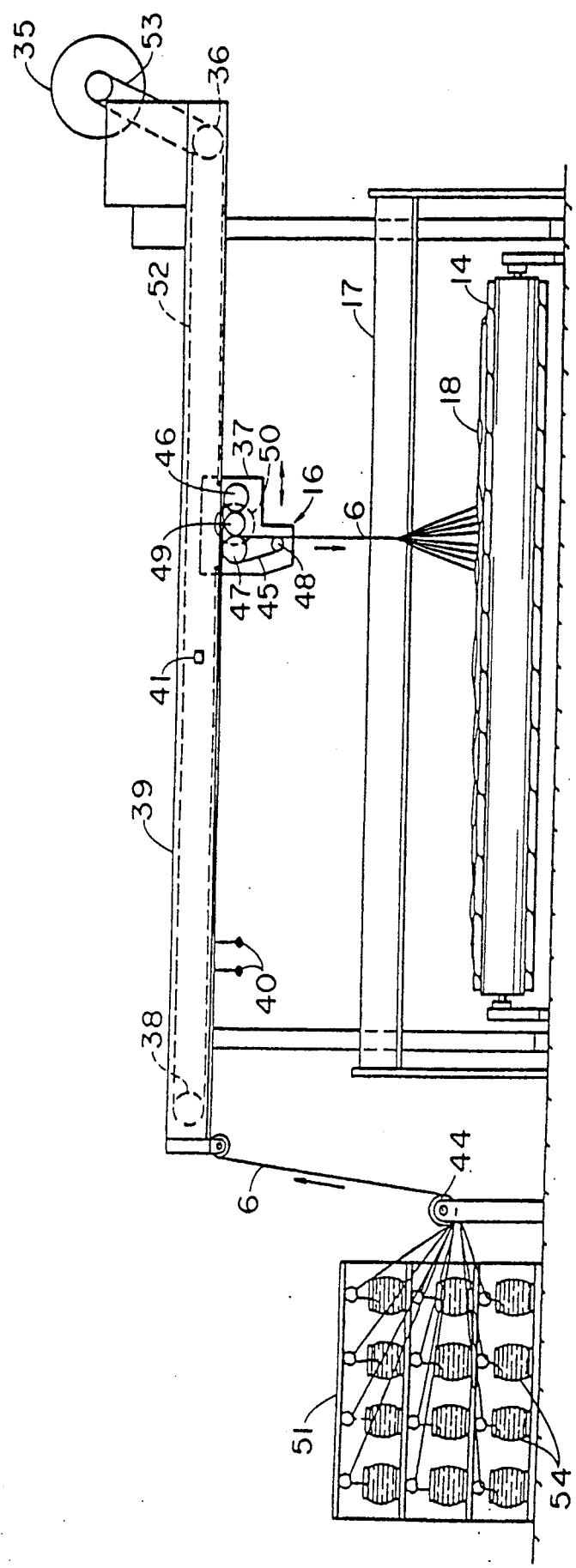
FIG. 4 is an elevational view of the front end of the mat line depicted in FIG. 3 looking into Section 4—4, with portions removed for clarity.
Figure 5:
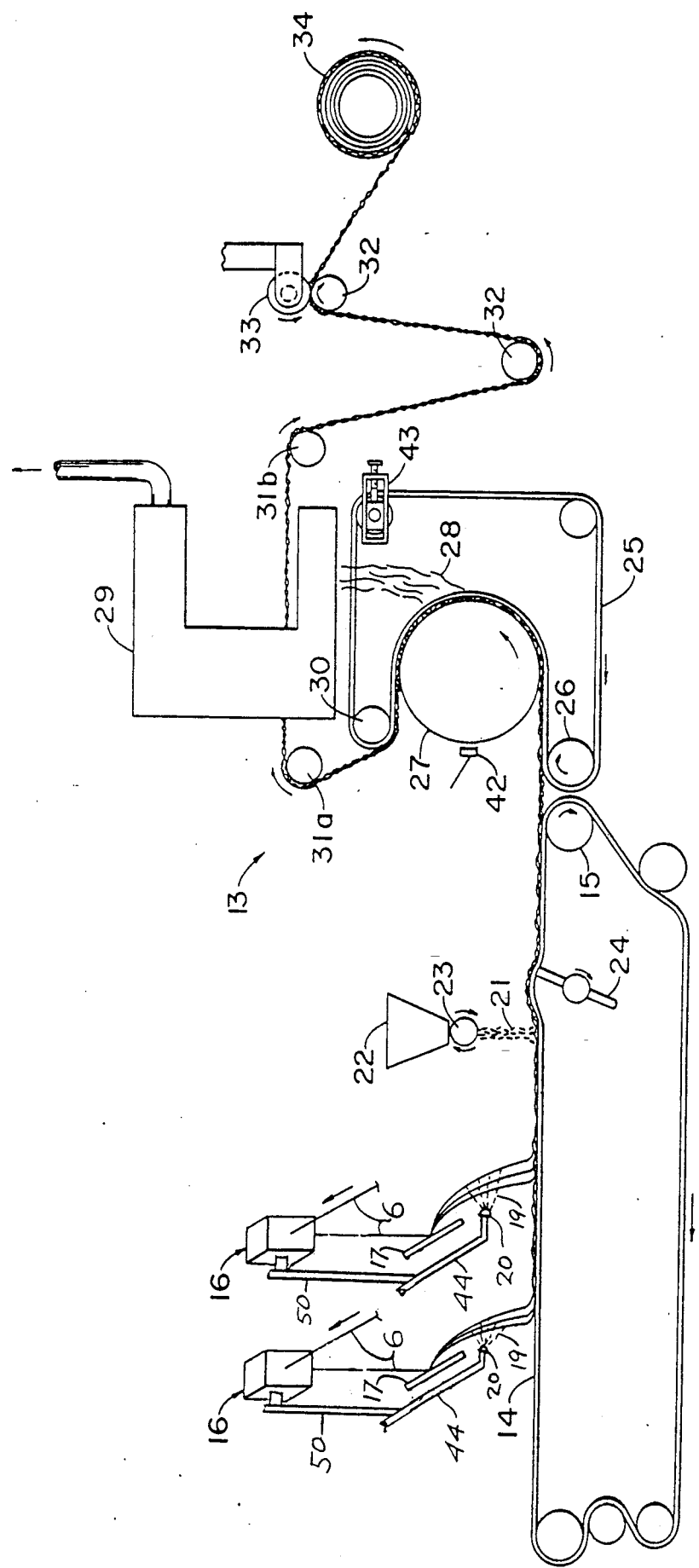
FIG. 5 is a side elevational view of the mat line depicted in FIG. 3.

FIGS. 3, 4, and 5 depict an apparatus known as a mat line (13) for making mats of continuous strand glass fibers. Although not limited in the present invention, an endless open mesh belt, preferably a stainless steel chain, acts as a conveyor (14) which is continuously driven by an electric motor (not shown) and spaced drive rollers (15). In commercial applications, the conveyor (14) will move at speeds up to about 20 to 25 ft/min (6.1 to 7.6 m/min.). Strand (6) is shown being projected downwardly onto the surface of the conveyor by means of two reciprocating strand feeders (16). (While only two such strand feeders are shown in the drawing, this is for illustrative purposes only, and the actual number used can be greater.).

As is indicated in FIG. 3, each feeder (16) traverses across a fixed width of the conveyor (14) while strand is deposited therefrom. Individual strands (6) may be drawn from a supply source such as a plurality of previously made forming packages (54) (as shown in FIG. 4) or from direct-draw or marble-melt fiber glass bushings (not shown) in the manner illustrated in U.S. Pat. Nos. 3,883,333 (Ackley) and 4,158,557 (Drummond).

In the prior art, strand (6) was deposited from each feeder apparatus (16) directly onto the moving conveyor (14). While this technique produced an acceptable mat, it was later observed that the strand so deposited often tended to assume a preferred orientation. To overcome this, the use of deflector plates rigidly attached to each feeder apparatus in such a fashion that the strand would impinge upon them and be deflected randomly onto the conveyor was adopted. This produced a mat having more uniform tensile properties (See U.S. Pat. No. 4,345,927 (Picone)). Another type of rigidly attached deflector, such as that disclosed in U.S. Pat. No. 4,615,717 (Neubauer, et al.), was later developed to divide the strand as it was ejected by the feeder into a plurality of filamentary arrays that would be deflected and deposited onto the surface of the conveyor in the form of elongated elliptical loops. More recently, it has been shown in U.S. Pat. No. 4,955,999 to Schaefer et al that the use of adjustable stationary deflectors (17) attached directly to the frame of the mat line (13) resulted in an improvement over the prior art while also reducing the momentum associated with the reciprocating feeders (16).

After the strand (6) impacts the deflector (17) and is deflected, it falls onto the surface of the conveyor (14) and assumes a random orientation to form an unconsolidated carpet of strand or loose fiberous mat structure (18). Although not limited in the present invention, in the particular embodiment shown in FIGS. 3 through 5, as the mat (18) is advanced forward along with the conveyor (14), the strand (16) is wetted prior to depositing a powdered resin on the mat (18), as will be discussed later in more detail. A supply line 44 with a nozzle (20) is supported from a frame (50) (shown only in FIG. 5) which in turn is hung from each feeder (16). As each feeder (16) traverses across the conveyor (14), the nozzle (20) travels with it and sprays the strand (6) in mid-air with a water spray (19) after they impact the deflectors (17) but before the strand (6) is deposited on the conveyor (14). Residual water spray from the nozzles 20 further wets the unconsolidated mat (18). With this wetting arrangement, it has been found that approximately 90 percent of the water spray (19) is retained by the mat (18) which exhibits a 4 to 6 percent moisture content, by weight, after spraying. Next, powdered resin particles (21) contained in a hopper (22) are spread over the surface of the mat (18). Although not limited in the present invention, in the particular embodiment shown in FIGS. 3 and 5, the resin particles (21) are sprinkled onto the surface of the mat (18) by means of a grooved rotating feeder roll (23). The particles exit the bottom of the hopper by gravity, fall into the grooves of the feeder roll and, as the feeder roll rotates, fall out again onto the mat (18). If required, a rotating beater bar (24) having attached flanges may be used to agitate both the conveyor (14) and the loose mat (18) up and down to help disperse the powdered resin particles (21) throughout the interior of the mat (18). (A number of lobed cams, a lobed shaft or other mechanical reciprocating device could also be used to accomplish this same result.).

As an alternative, water may be sprayed directly onto the mat (18) from above conveyor (14) or a stationery set of nozzles (not shown) may be positioned beneath the deflectors (17) to wet the strand (6) in mid-air as previously discussed. However, these alternatives require more water than the embodiment of the invention shown in FIGS. 3 and 5, discussed above, and the additional water sprayed on the mat (18) must be removed during processing of the mat (18), as will be discussed later. In addition, it has been found that excess water on the upper surface of the mat (18) tends to impede the free distribution of the powdered resin (21) throughout the mat (18).

Figure 6:
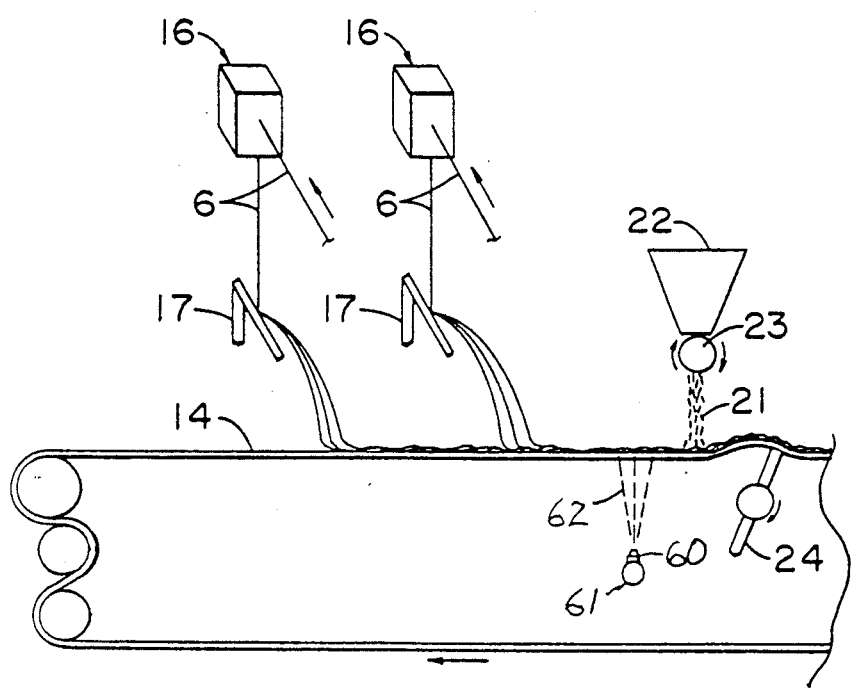
FIG. 6 is a side elevational view similar to FIG. 5 showing an alternate embodiment of the invention.

FIG. 6 illustrate another alternative to spraying the strand (6) in mid-air, wherein water (19) is sprayed upwardly from a plurality of nozzles (60) (only one shown in FIG. 6) positioned along a supply line (61) which extends beneath the width of the conveyor (14). Water spray (62) penetrates the open mesh of the conveyor (14) and the loose fiberous mat structure (18) whereupon it disperses and wets the interior of the mat (18). When the strands (6) forming the mat (18) are wet from below, the water must be sprayed at high pressure (greater than 80 psi (54.7 newtons/cm$^2$)) in order for the water to fully penetrate the conveyor (14) and mat (18). Similar to the alternatives discussed above, spraying from below the conveyor (14) requires more water than the embodiment of the invention shown in FIGS. 3 through 5. Furthermore, approximately 25 to 35 percent of the sprayed water is retained by the mat (18) and the mat (18) is 15 to 25 percent water by weight, with localized area having an even higher moisture content. Because of this high moisture content, as compared to the 4 to 6 percent water content of mat (18) made by spraying the water on the strand (6) in mid-air as discussed earlier, it takes more time to remove the moisture from the mat (18), as will be discussed later. For these reasons, it is preferred that the water be sprayed onto the strand (6) by a travelling nozzle (20) as shown in FIGS. 3 and 5 as it is in mid-air prior to being deposited on the conveyor (14).

The mat (18) is then passed to a second continuous conveyor or belt (25). This conveyor (25) moves along the path depicted in FIG. 3 by a separate drive roller (26) and a plurality of free-turning idler rollers. Depending the desired final product, the second conveyor (25) may or may not move at the same speed as the first conveyor (14). In particular, in some applications, it may be desirable to stretch the mat (18) slightly in order to insure that it is transferred smoothly from the first conveyor (14) to the second conveyor (25).

As the mat (18) passes to the second conveyor (25), it is pinched between the surfaces of the conveyor (25) and a separately driven, rotating calender roll (27). The calender (27) is heated such that its surface temperature is sufficient to melt the resin particles (21) previously distributed within the mat (18) and expel excess moisture in the form of steam (28). The length of time that the mat (18) must be heated is directly related to the moisture content of the mat (18) as it moves between the conveyor (25) and the calender roll (27). The higher the moisture content of the mat (18), the longer the mat (18) must be heated to expel excess moisture. This steam (28) is removed by means of a hood (29) and vented away. Furthermore, as the loose mat (18) passes around the circumference of the calender roll (27), it is compacted against it by the tension in the belt (25). The belt tension may be varied by means of adjustable block bearings (43) (shown only in FIG. 5) or pneumatically controlled cylinders (not shown). As the belt (25) turns the uppermost left idler roll (30), it separates from the compacted mat (18) and continues its path over the other idler rolls. The compacted mat (18) is passed up over idler roll (31a), through an opening in the hood (29) used to vent the expelled steam (28), and onto a second idler roll (31b) located in front of the hood (29). This arrangement prevents the steam (28) driven off from the mat by the heated calender roll (27) from condensing back onto its underside surface.

The mat (18) is finally transferred by various rollers (32), its edges trimmed by rotating cutters (33), and finally collected onto either a rotating core-driven or surface drive take-up roll (34).

Turning now to FIG. 4, individual strands (6) are guided through a plurality of ceramic eyelets (not shown) and passed to each feeder apparatus (16) where they are projected downwardly and deposited onto the surface of the moving chain conveyor (14). A plurality of strands may be provided to each individual feeder (16). Here, the strand is shown being supplied from a multiplicity of previously made forming packages (54) held on a creel (51). It will be understood by those skilled in the art, however, that other sources of supply such as roving packages and both direct-draw and marble-melt bushings may be used as well. (The exact number of strands supplied to each feeder (16) will depend on the speed of the conveyor (14), number of feeders (16) in operation, and the desired density or thickness of the finished mat (18).) The feeders (16) are caused to reciprocate or traverse back and forth across the width of the conveyor (14) by means of a flexible drive chain or cable (52). As discussed earlier, the nozzles (20) (shown in FIGS. 3 and 5) are attached to the feeders (16) and reciprocate with it to wet the strand (6). A second flexible drive belt or chain (53) connects the output shaft of a reversible electric motor (35) with a first rotatable pulley or drum (36) about the circumference of which is wrapped the flexible drive chain or, preferably, a stranded steel cable (52). One end of the cable (52) is firmly attached, as shown in FIG. 4, to one side of the feeder frame (37). The cable (52) is then wrapped once or twice around the circumference of the driven drum (36) and brought across the width of the conveyor (14) and over a second free-turning idler drum (38) where the opposite end of the cable (52) is attached to the other side of the feeder frame (37). Each feeder (16) rides within a track (39) as it reciprocates across the moving conveyor (14). Thus, as the driven drum (36), shown in FIG. 4, is rotated clockwise by means of the electric motor (35), the feeder (16) and nozzles (20) (not shown in FIG. 4) will advance to the left. When the motor (35) reverses its direction and turns the drum (36) counter-clockwise, the feeder (16) will advance toward the right.

With regard to the feeders (16), strand (6) is guided by a plurality of ceramic eyelets (not shown) so as to pass along the outside surface of a flexible belt (45). The belt (45) and strand (6) are passed around a free-turning cylindrical hub (46) mounted on a ball bearing (not shown). Upper (47) and lower (48) idler rollers are also provided. The belt (45) is caused to advance by friction between its inside surface and a cylindrical cage (49) which is driven by a second electric motor (50). The cage (49) has a plurality of pins or bars (not shown) protruding from its surface and running parallel along its length. The strand (6) contacts these bars and is pinched between them and the outer surface of the belt (45). This produces the tractive force necessary to advance the strand (6) from the individual forming packages (54), bushing assembly (1) or other source of supply.

Mechanical limit switches (40) and a magnetic proximity sensor (41) may be used to signal the appropriate time to reverse the feeders (16) and monitor their position. Conventional electrical switching circuits, well understood by those skilled in the art, may be used to control the feeders (16), however, in the instant invention, the use of either a programmable logic controller using stepper motors or a board-level motion controller using servomotors is preferred. (See U.S. Pat. Nos. 4,963,176 (Bailey, et al.) and 4,964,891 (Schaeffer).)

FIG. 5 presents a side elevational view of the mat line (13) showing the relationship of the various components in greater detail. As was mentioned previously, in the preferred embodiment of the present invention, a spray of water (19) from nozzle (20) supported from feeder (16) is used to wet the mat (18) prior to sprinkling powdered resin particles upon its surface. Subsequent agitation by the rotating beater bar (24) results in an even distribution of the resin particles (21) inside the loose mat structure. In the embodiment of the present invention shown in FIGS. 3 through 5, the loose mat (18) is impregnated with powdered resin particles (21) sprinkled directly onto its surface by means of a hopper (22) and rotating feeder roll (23). Several types of powdered thermoset and thermoplastic resins are available for this purpose. For example; thermoplastic resins such as homopolymers and copolymers of resins such as (1) vinyl resins formed by the polymerization of the vinyl halides or by the copolymerization of vinyl halides with unsaturated polymerizable compounds, e.g., vinyl esters; alpha, beta-unsaturated acids; alpha, beta-unsaturated esters; alpha, beta-unsaturated ketones; alpha, beta-unsaturated aldehydes and unsaturated hydrocarbons such as butadienes and styrenes; (2) poly-alpha-olefins such as polyethylene, polypropylene, polybutylene, polyisoprene and the like including copolymers of poly-alpha-olefins; (3) phenoxy resins; (4) polyamides such as polyhexamethylene adipamide; (5) polysulfones; (6) polycarbonates; (7) polyacetyls; (8) polyethylene oxide; (9) polystyrene, including copolymers of styrene with monomeric compounds such as acrylonitrile and butadiene; (10) acrylic resins as exemplified by the polymers of methyl acrylate, acrylamide, metholoacrylamide, acrylonitrile and copolymers of these with styrene, vinyl pyridines, etc.; (11) neoprene; (12) polyphenylene oxide resins; (13) polymers such as polybutylene terephthalate and polyethyleneterephthalate; and (14) cellulose esters including the nitrate, acetate, propionate, etc., may be used. This list is not meant to be limiting or exhaustive but merely illustrates the wide range of polymeric materials which may be used in the present invention. It is also contemplated that fillers may be employed in the thermoplastic resins where desired. These fillers can be any of a variety of conventional resin fillers known in the art, e.g., talc, calcium carbonate, clays, or diatomaceous earths being a few of those typically used.

Similarly, powdered thermoset resins which are insoluble in styrene such as an aliphatic polyester known as FILCO TM 657 available from Maffei Chimica of Italy may also be used. A particular resin which has been found to provide excellent bonding properties is the unsaturated polyester known as polyethyleneglycol-fumarate. This resin is commonly known by its trade name, STRATYL TM P-80 and is available from Rhone-Poulenc Industries of Paris, France.

In an alternative embodiment of the instant invention, thermoplastic resins such as polyethylenes, poly-vinyl and ethylene-vinyl acetates as well as polyester yarns capable of being manufactured in an essentially continuous thread-like form may be used in place of a powdered resin. Resin so provided in this form may be supplied simultaneously to the strand feeders (16) along with the glass fiber strands. This eliminates the need for the hopper (22), feeder roll (23), and beater bar (24) shown in FIGS. 3 and 5 since the thread-like resin will be distributed randomly along with the glass on the surface of the chain conveyor (14).

Irrespective of which technique is used to deposit resin inside the mat structure, the application of heat is necessary to melt and/or cure the resin and enable the glass strands to adhere to one another. In the prior art, an oven was typically used to accomplish this. In the instant invention, a heated calendering roll (27) and a second perforated belt conveyor (25) are instead used to compress the loose mat (18), expel moisture in the form of steam (28), and melt the resin. The calendering roll (27) may be heated internally by means of radiant electric heaters. In the prototype version of the commercial mat line, this type of calendering drum was obtained from Radiant Heating Inc. of Coventry, Rhode Island. It is also contemplated that, in industrial applications, larger drums heated internally by passing a liquid heat transfer medium continuously through them may be used. For example, liquid heat transfer fluids such as DOWTHERM TM H or G or THERMINOL TM 55, 60 or 66 may be used. (DOWTHERM and THERMINOL are registered trademarks of the Dow Chemical Company of Midland, Mich. and the Monsanto Company of St. Louis, Mo. respectively.)

In a preferred embodiment of the instant invention, the powdered thermosetting resin STRATYL TM P-80, which was mentioned previously, melts somewhere between 147° F. to 226° F. (64° C. to 108° C.) and total curing occurs at about 270° F. (132° C.). In order to insure that the interior of the mat achieves these temperatures, the surface temperature of the calendering drum is maintained somewhere within the range of about 400° F. to 500° F. (204° C. to 260° C.) with about 430° F. (237° C.) being preferred for this particular resin. While a range of temperatures of anywhere from 200° F. to 500° F. (93° C. to 260° C.) can be maintained continuously by the calender roll, intermittent operation of up to 550° F. (288° C.) is possible. A thermocouple (42) positioned in front of the calender roll may be used to measure its surface temperature. Note that in the instant invention, the thermocouple (42) does not actually touch the surface of the unit but instead is mounted a slight distance away from it. Thus, the heat actually measured is that radiated away from the surface of the calender roll (27) and subsequently detected by the thermocouple (42). As was mentioned previously, the loose mat (18) is compressed or compacted between the rotating calendering roll (27) and a second continuously driven flexible belt (25). Due to the high temperatures involved in this process, a perforated TEFLON TM coated glass fiber belt was used in the prototype matline. In an industrial version of the instant invention, the use of a belt of NOMEX TM aramid fibers is contemplated. (Both TEFLON and NOMEX are registered trademarks of E.I. Dupont de Nemours and Company of Wilmington, Del.) Belts made from these materials may be obtained from Applied Fabric Technologies, Inc. of Orchard Park, N.Y. or the Chemical Fabrics Corporation of North Bennington, Vt. Belts made from other materials capable of withstanding the temperatures used in the calendering operation may also be used. These belts (25) may be perforated in order to allow water present in the mat to be expelled as steam and withdrawn through the exhaust hood (29). Belt tension, and thus the amount by which the loose mat (18) is compacted against the calender roll (27), may be adjusted by an adjustable bearing block (43) located on each side of the calendering roll frame. In an industrial scale version of the instant invention, pneumatic air cylinders may be used in place of the bearing blocks to apply the belt tension.

The use of the instant invention in the production of a continuous glass fiber strand mat using a thermosetting resin will now be illustrated in detail, by way of an example.

EXAMPLE 1

One application of the instant invention to produce a prototype of a continuous strand fiber glass mat is illustrated in FIGS. 4 and 5. Forming packages (54) of strand were held by means of a creel (51). Multiple strands (6) were passed through ceramic eyelet guides located on the creel and then through a guide bar (44). The strands (6) were then passed to two reciprocating strand feeders (16). Stationary deflectors (17), previously described, were also employed to deflect the strand as it was ejected from each feeder onto the surface of the moving chain conveyor (14). A water spray consisting of six nozzles each emitting about 0.024 gallons per hour (0.091 liters per hour) was used to wet the underside of the chain conveyor (14). This water penetrated the chain sufficiently to wet the mat and yield a moisture content of somewhere between 15 and 20 percent. In the preferred embodiment, an unsaturated thermosetting polyester resin known as STRATYL TM P-80 was sprinkled onto the surface of the mat so that about 2 to 4 percent by weight of this resinous material, in addition to the binder already present on the glass strand as a result of the forming process, was added.

The first chain conveyor (14) was caused to advance forward at a constant speed of about 7 ft/min. (2.13 meter/min.). The loose mat, after being agitated by the beater bar (24), was transferred to the second perforated belt conveyor (25) and compressed between it and the calender roll (27). The mat was also stretched slightly by about 1 to 2 percent during this transfer operation. The calender roll was heated to a surface temperature of about 430° F. (221° C.) and rotated at a surface speed slightly greater than 7 ft/min. (2.13 meters/min.). The second conveyor (25), which compressed the belt against the surface of the calender (27), also moved at a corresponding surface speed so that there was no slip between the relative motion of calender roll (27) and the second belt conveyor (25).

The two feeders were reciprocated once every 8.5 seconds back and forth across a distance of about 42 inches at an average velocity of about 25 ft/min. The electric motors (50) carried on each feeder (16) advanced the continuous strand supplied from the forming packages (54) to the surface of the conveyor at a rate somewhere between 1000 and 1400 ft/min. (305 to 427 meters/min.), but preferably at about 1275 ft/min. (389 meters/min.).

In the continuous strand mat which was produced, randomly deposited strands of "H" fibers were supplied from H-52, four-way split forming packages having about 400 individual glass fibers per strand with one pound (0.45 kilograms) containing about 5200 yards (4756 meters) of strand. (The use of this alphabetical designation to indicate fiber diameter is well known in the art and here, the "H" designation indicates that each individual glass fiber has a diameter on the order of about 10.8 microns. (See Lowenstein, supra, at page 25.)) In order to produce a mat having a density of about 1 oz/sq-ft. (0.31 kg/meter$^2$), 10 ends of such split strand were provided to each feeder so that about 98 lb/hr. (44.5 kg/hr.) of glass was deposited onto the surface of the conveyor. In order to produce a mat having a density of about 2 oz/sq/ft. (0.62 kg/meter$^2$), the speed of the first chain conveyor was reduced to about 3.5 ft/min. (1.1 meters/min.) and the other parameters remained the same.

In the production of commercial quantities of continuous fiber glass strand mat, the present invention may be modified slightly without departing from its spirit or scope. For example, between the time of their leaving the creel (51) and entering the feeder (16), the strands may be wet slightly with water or some other liquid antistatic agent to reduce the possible buildup of static electricity. This helps to reduce any tendency of the strand to break and wrap itself around the belt-driven feeders. Generally, the use of water or an antistatic agent such as Triton X-100 which is a nonionic octylphenoxy polyethoxy ethanol surfactant is recommended, especially when the strand is supplied from extremely dry forming packages which may have been stored for several months.

Also, as was disclosed in U.S. Pat. Nos. 4,963,176 (Bailey, et al.) and 4,964,891 (Schaeffer), up to 12 reciprocating feeders may be used simultaneously with one another in order to produce commercial quantities of continuous fiber glass strand mat.

Although all of the above examples have relied upon air drying of the strand and resin mat as it is collected onto a take-up roll (34), it is a common practice, well known in the art, to solidify the mat by means of chill rollers prior to winding it onto a collection roll.

While the mats described in the above disclosure and the preceding example have all been illustrated as being made from fiber glass strand, it is not intended that the application of the methods disclosed by this specification are necessarily limited thereto. For example, the same methods described herein may be used in the production of mats made from any other natural or synthetic fibers as well as glass. Strands composed of nylon, polyester, and the like may also be substituted or mixed with one another as well as with packages of glass fibers and simultaneously deposited onto the surface of the conveyor. This concept also embraces the mixing of threads or strands of suitable resin with the glass strand ejected by the feeders and subsequently melted and/or cured by the heated calender roll.

Also, while the above example has illustrated the production of a mat made from glass strand comprised of "H" fibers, it should be understood that the instant invention can be adapted to produce mat from strands comprised of any fiber diameter such as a "D"-type fiber or larger.

Furthermore, while the use of certain specific components has been described, it is not intended that they be necessarily limiting since all are commercially available items and similar ones may be readily substituted to achieve substantially the same results.

Thus, while the present invention has been described with respect to certain specific embodiments and components and illustrated with its application to the production of certain specific products, it is not intended to be so limited thereby except insofar as set forth in our accompanying claims.

Accordingly, we claim:

1. In a method for making a mat of continous fiber glass strand by reciprocating a plurality of strand feeders across the surface of a moving conveyor, each of said feeders drawing at least one strand from a supply source and projecting said strand from said feeder and depositing it onto an upper surface of said conveyor so as to form thereon a loose fibrous mat structure, the improvement comprising the steps of:
   distributing resin generally throughout said loose fiberous mat structure;
   wrapping said conveyor around a portion of the circumference of a rotating calender roll so as to compact said loose mat structure and resin between said roll and said conveyor; and
   heating said roll to a surface temperature sufficient to remove moisture from said mat and melt said resin to bond said individual glass strands forming said mat structure together with one another as said mat is compacted between said roll and conveyor.

2. The method as in claim 1 including the step of supplying said strand to said feeders from a plurality of roving packages.

3. The method as in claim 1 wherein said distributing step includes the steps of wetting said mat, depositing powdered resin onto an upper surface of said loose mat structure, and agitating said conveyor and said mat thereon so as to disperse said powdered resin evenly throughout the interior of the loose mat structure.

4. The method as in claim 3 wherein said wetting step includes the step of spraying water onto said strands after being projected from said feeders but prior to being deposited onto said conveyor so as to wet said loose fiberous mat structure.

5. The method as in claim 4 wherein said spraying step includes the step of reciprocating spraying means across the surface of said moving conveyor such that said water sprays said strands prior to said strands being deposited on said conveyor.

6. The method as in claim 3 wherein said wetting step includes the steps of spraying water from beneath said first conveyor so as to penetrate, disperse, and wet said loose fiberous mat structure while supported on said conveyor.

7. The method as in claim 1 wherein said depositing step includes the steps of providing at least one thread of continuous length to at least one of said feeders, said thread being previously formed from a resinous material, and depositing said thread onto said conveyor simultaneously with said glass strand projected from said feeder.

8. The method as in claim 1 wherein distributing step includes the step of distributing a thermoplastic resin throughout said mat structure.

9. The method as in claim 8 wherein conveyor is a first conveyor, said passing step includes the step of passing said mat and resin onto a second moving conveyor prior to said compacting and heating step and further including the step of cooling said glass and resin upon exiting said heated rollers and second conveyor.

10. The method as in claim 9 wherein said cooling step includes the step of air drying said mat as it is collected onto a take-up roll.

11. The method as in claim 9 wherein said cooling step includes the step of passing said mat between a pair of chilled rollers.

12. The method as in claim 9 wherein said distributing step includes the steps of spraying water onto said strands after being projected from said feeders but prior to being deposited onto said first conveyor so as to wet said loose fibrous mat structure, depositing powdered resin onto an upper surface of said loose mat structure, and agitating said first conveyor and said mat thereon so as to disperse said powdered resin evenly throughout the interior of the loose mat structure.

13. The method as in claim 9 wherein said first conveyor is a perforated conveyor and said distributing step includes the steps of spraying water from beneath said first conveyor so as to penetrate, disperse, and wet said loose fibrous mat structure while supported on said first conveyor, depositing powdered resin onto an upper surface of said loose mat structure, and agitating said first conveyor and said mat thereon so as to disperse said powdered resin evenly throughout the interior of the loose mat structure.

14. The method as in claim 9 wherein said depositing step includes the steps of providing at least one thread of continuous length to at least one of said feeders, said thread being previously formed from a resinous material and depositing said thread onto said first conveyor simultaneously with said glass strand projected from said feeder.

15. The method as in claim 1 wherein said distributing step includes the step of distributing a thermosetting resin throughout said mat structure.

16. The method as in claim 15 further including the step of maintaining said heated roller at a surface temperature sufficient to heat said entire compacted mat structure to an internal temperature sufficient to melt and cure said resin.

17. The method as in claim 16 wherein said distributing step includes the steps of spraying water onto said strands after being projected from said feeders but prior to being deposited onto said first conveyor so as to wet said loose fibrous mat structure, depositing powdered resin onto an upper surface of said loose mat structure, and agitating said first conveyor and said mat thereon so as to disperse said powdered resin evenly throughout the interior of the loose mat structure.

18. The method as in claim 16 wherein said first conveyor is a perforated conveyor and said distributing step includes the steps of spraying water from beneath said first conveyor so as to penetrate, disperse, and wet said loose fibrous mat structure while supported on said first conveyor, depositing powdered resin onto an upper surface of said loose mat structure, and agitating said first conveyor and said mat thereon so as to disperse said powdered resin evenly throughout the interior of the loose mat structure.

19. The method as in claim 16 wherein said depositing step includes the steps of providing at least one thread of continuous length to at least one said feeder, said thread being previously formed from a resinous material and depositing said thread onto said first conveyor simultaneously with said glass strand projected from said feeder.

20. The method of claim 16 wherein said thermosetting resin is a powdered polyethylene-glycol-fumarate.

21. The method of claim 20 wherein said maintaining step includes the step of maintaining said surface temperature of each said calendering roll between 200° and 500° F.

22. An apparatus for making a mat of continuous fiber glass strand comprising:
a plurality of reciprocating strand feeders each capable of drawing at least one strand from a supply source, projecting said strand from said feeder, and depositing said strands onto an upper surface of a conveyor so as to form thereon a loose fibrous mat structure;
means to distribute resin generally throughout said loose fibrous mat structure;
a rotating calender roll;
means to wrap said conveyor around a portion of said roll so as to compact said loose mat structure and resin between said conveyor and said roll; and
means to heat said roll to a surface temperature sufficient to remove moisture from said mat and melt said resin to bond said individual glass strands forming said mat structure together with one another as said mat is compacted between said roll and conveyor.

23. The apparatus as in claim 22 wherein said distributing means includes means to wet said mat, means to deposit powdered resin onto an upper surface of said loose mat structure, and means to agitate said conveyor and said mat thereon so as to disperse said powdered resin evenly throughout the interior of the loose mat structure.

24. The apparatus as in claim 23 wherein said wetting means includes spray nozzles positioned relative to said strands such that said nozzles are capable of spraying said strands with water after being projected from said feeders but prior to being deposited onto said conveyor so as to wet said loose fibrous mat structure.

25. The apparatus as in claim 24 further including means to support said nozzles from selected ones of said reciprocating feeders.

26. The apparatus as in claim 23 wherein said wetting means includes a plurality of spray nozzles positioned beneath said conveyor such that said nozzles are capable spraying water through said conveyor to wet said loose fibrous mat structure supported on said conveyor.

27. The method as in claim 22 wherein said distributing means includes means to provide at least one thread of continuous length to at least one of said feeders, said thread being previously formed from a resinous material, wherein said thread is deposited onto said conveyor simultaneously with said glass strand projected from said feeder.

* * * * *